United States Patent [19]

Kudomi et al.

[11] Patent Number: 4,482,682

[45] Date of Patent: Nov. 13, 1984

[54] PROCESS FOR PREPARING WATER-SOLUBLE, PARTIALLY-HYDROLYZED, SOLID ACRYLAMIDE POLYMER

[75] Inventors: Hiroyuki Kudomi; Shinichi Sato, both of Kitakyusyu, Japan

[73] Assignee: Mitsubishi Chemical Industries, Limited, Tokyo, Japan

[21] Appl. No.: 477,956

[22] Filed: Mar. 23, 1983

[51] Int. Cl.³ ................................................ C08F 8/12
[52] U.S. Cl. ................................... 525/369; 525/329.4
[58] Field of Search ............................... 525/369, 329.4

[56] References Cited

U.S. PATENT DOCUMENTS 3,784,597  1/1974  Fujimoto et al. ................... 525/369

Primary Examiner—Joseph L. Schofer
Assistant Examiner—Bernard Lipman
Attorney, Agent, or Firm—Kenway & Jenney

[57] ABSTRACT

A partially-hydrolyzed, solid acrylamide polymer is prepared by bringing a hydrous gel of a water-soluble acrylamide polymer into contact with an aqueous caustic alkali solution, maintaining the polymer at an elevated temperature and under highly humid conditions to hydrolyze certain amido groups of the water-soluble acrylamide polymer and then drying the thus partially-hydrolyzed acrylamide polymer. The resultant polymer contains less water-insoluble components and hardly forms precipitate even in salt water containing calcium ions. It can be suitably used for coagulation of suspension and in secondary oil recovery.

6 Claims, No Drawings

PROCESS FOR PREPARING WATER-SOLUBLE, PARTIALLY-HYDROLYZED, SOLID ACRYLAMIDE POLYMER

BACKGROUND OF THE INVENTION

This invention relates to a process for the preparation of a water-soluble, partially-hydrolyzed, solid acrylamide polymer. Partially-hydrolyzed acrylamide polymers have found wide-spread commercial utility as coagulants for various suspensions. Recently, they are also employed as secondary recovering agents for mining petroleum resources.

An acrylamide polymer is generally obtained by polymerizing acrylamide alone or copolymerizing acrylamide and another monomer copolymerizable with acrylamide in an aqueous medium. A partially-hydrolyzed polymer may also be obtained by treating the thus-prepared acrylamide polymer with an alkaline substance. Such a polymer formed in water or subjected further to hydrolysis is in the form of an extremely-viscous hydrous gel containing a great deal of water. In the industry, such a hydrous gel is dehydrated into a solid polymer. As an industrially-applicable preparation process of a partially-hydrolyzed, solid acrylamide polymer, U.S. Pat. No. 4,146,690 teaches dividing a hydrous gel of a polymer, which has been obtained by polymerization of an aqueous solution of acrylamide, into grains, mixing an aqueous caustic alkali solution with the thus-formed grains and subsequently drying them by hot air. In this process, the hydrolysis reaction of the polymer is allowed to proceed only to the extent of about 20–30% of the intended percentage of hydrolysis during its mixing with the caustic alkali. The remaining part of the hydrolysis reaction is allowed to take place in the hot-air drying step. Namely, the added caustic alkali adheres substantially in its entirety on polymer grains but the hydrolysis reaction of the polymer grains does not take place to any significant extent while the polymer grains are mixed with the caustic alkali, because the reaction velocity of hydrolysis is slow at low temperatures. The hydrolysis is brought to completion in the subsequent hot-air drying step, owing to the action of the caustic alkali adhered on surfaces of the polymer grains.

However, polymers hydrolyzed in accordance with the above-described process tend to contain some components which will not be completely dissolved in water. Use of such polymers, which contain water-insoluble components, as coagulants or secondary petroleum-recovering agents may bring about some undesirable results. Accordingly, it is desirable to minimize such water-insoluble components to the extent possible.

An acrylamide polymer hydrolyzed in accordance with the above-described process is susceptible of forming an insoluble precipitate in a solution containing abundant calcium and sodium ions. U.S. Pat. No. 3,039,529 suggests that the formation of such a precipitate renders the polymer unsuitable for use in secondary oil recovery.

U.S. Pat. No. 3,039,529 has also proposed to employ a polymer having a degree of hydrolysis of 12–67%, and preferably 12–45% in order to avoid the formation of precipitate in a solution containing calcium and sodium ions at high concentrations. As a process for obtaining such a hydrolyzed polymer, it also discloses adding sodium hydroxide to an aqueous solution containing 0.934% of a polymer, carry out its hydrolysis for 5 hours at 90° C., and then pouring the liquid reaction mixture into the same volume of methanol so as to cause the resultant hydrolyzed polymer to precipitate. Use of such a dilute polymer solution is however uneconomical because a great deal of energy or a dehydrating agent such as methanol is indispensable for removing the water and obtaining the resultant polymer in a solid state.

The present inventors have conducted research with a view toward developing a process for preparation of a water-soluble, partially-hydrolyzed, solid polymer which contains less water-insoluble components and forms less precipitate in a solution containing calcium and sodium ions. As a result, it has been found that the contents of water-insoluble components and the formation of precipitate can both be reduced when the hydrolysis of an acrylamide polymer is effected by allowing the acrylamide polymer to contact a caustic alkali under certain specific conditions.

SUMMARY OF THE INVENTION

Namely, the essential features of this invention reside in a process for preparing a water-soluble, partially-hydrolyzed, solid acrylamide polymer, which process comprises polymerizing an aqueous acrylamide-containing solution in the presence of a polymerization initiator to obtain an acrylamide polymer in the form of a hydrous gel, dividing the hydrous gel into grains, bringing the grains into contact with an aqueous caustic alkali solution, maintaining the polymer at a temperature of from 50° to 150° C. while maintaining the water content of the granular polymer substantially at the same level so that the hydrolysis of the amido groups in the acrylamide polymer has been achieved to the 60% or higher of the desired percentage of hydrolysis, and then drying the thus-prepared polymer grains with hot air.

DETAILED DESCRIPTION OF THE INVENTION

In the present invention, the term "an acrylamide polymer" embraces, besides a homopolymer of acrylamide, water-soluble copolymers of acrylamide and other copolymerizable monomers. As exemplary copolymerizable monomers, may be mentioned acrylic acid, sodium acrylate, 2-acrylamide propane-sulfonate, and their mixtures. The preferred proportion of acrylamide in such a copolymer is generally 50 mole % or higher. By polymerizing acrylamide singly or in combination with one or more copolymerizable monomers in an aqueous medium in a manner commonly known in the art, a high molecular weight, water-soluble, hydrous gel-like polymer is obtained.

Although not necessarily limited to any specific ranges, the concentration of the monomer or the monomers in the aqueous medium may generally range from 15 to 45 wt.% (wt.% means % by weight) and preferably from 20 to 35 wt.%. Excessively low or high concentrations are not preferred because excessively low concentrations not only result in gel-like polymers having high tackiness but also render the drying of the gel-like polymers cumbersome whereas extremely high concentrations lead to extremely high temperatures in the polymerization systems, thereby causing thermal degradation of the resultant polymers.

As the polymerization initiator, a so-called radical polymerization initiator may be used. As illustrative radical polymerization initiators, may be mentioned azo compounds such as azobisisobutyronitrile and azobis(2-amidinopropane) hydrochloride, peroxides such as potassium persulfate, ammonium persulfate, and hydrogen peroxide. The peroxide may be used singly as well as redox polymerization initiators in combination with reducing agents such as sodium sulfite, ferrous sulfate and ferrous chloride. Two or more of the abovedescribed polymerization initiators may also be used in combination. The polymerization initiator may be used, generally, at 100–10,000 ppm and preferably at 200–5,000 ppm based on the monomer.

The polymerization is usually carried out by, after bubbling the aqueous solution of the monomer or monomers with $N_2$ gas, incorporating a predetermined amount of a catalyst and maintaining the polymerization system at temperatures in the range of $-10°$ C.–$+100°$ C. The resulting polymer is in the form of a hydrous gel. Where the concentration of the monomer or the monomers in the aqueous monomer solution ranges from 15 wt.% to 45 wt.%, the water content of the resultant polymer ranges from 85 wt.% to 55 wt.%.

The thus-obtained polymer in the hydrous gel form is then divided into grains. This granulation may be carried out, for example, by extruding the polymer through a perforated plate by means of a screw and then cutting it by a cutter. The thus-obtained grains may be of any shape such as spherical, cylindrical, cubic or the like. Their average grain diameters may generally be 2–20 mm and preferably 2–10 mm. Too small a grain diameter leads to excessively small diameters of the final solid products, whereas use of too large a grain diameter tends to induce uneven hydrolysis when the grains are brought into contact with an aqueous caustic alkali solution.

The thus-granulated polymer is thereafter brought into contact and treated with an aqueous caustic alkali solution. This is usually carried out by spraying the aqueous caustic alkali solution over polymer grains while mixing the polymer grains. Caustic soda or caustic potash may be employed as the caustic alkali and it is usually employed as an aqueous 20–47 wt.% solution. The amount of the caustic alkali to be used is determined by the desired percentage of hydrolysis. It may be the chemical equivalent to or somewhat in excess of the amount of amido groups to be hydrolyzed. The desired percentage of hydrolysis of the acrylamido groups in the polymer may vary depending on the end use of the polymer, and it may generally range from 5 to 50 mole % of the amido groups present in the starting acrylamide polymer.

It is essential in the present invention to achieve at least 60% and preferably 70% or more of a desired percentage of hydrolysis prior to the drying of the granular polymer by conducting the hydrolysis reaction of the polymer under specific conditions. It is preferable not to stop the hydrolysis from proceeding to a satisfactory extent prior to drying the granular polymer which would allow the hydrolysis to take place more intensively in the subsequent hot-air drying step, since this will result in more water-insoluble components in the resultant polymer.

After adding caustic alkali solution, the polymer may be maintained at temperatures of 50°–150° C. and preferably 65°–100° C. If the temperature should be too low, the hydrolysis reaction will not proceed smoothly. On the contrary, excessively high temperatures will induce thermal degradation of the resultant polymer. Therefore, neither too low temperatures nor too high temperatures are preferred. In addition, it is necessary to maintain the water content of the polymer at a substantially constant level during hydrolysis. The water content of polymer means percent of water per sum of water and polymer. The weight of the polymer changes after hydrolysis since carboxamide groups of the polymer are converted to carboxylate groups by the hydrolysis. So the water content differs a little after hydrolysis, if there is no addition nor loss of water from the reaction system. In the present invention, it is recommended that the drop of the water content (%) of the polymer after hydrolysis is kept within 10% (on the wet weight basis), preferably within 3%.

If the water content of the polymer should drop to any significant extent in the course of the first hydrolysis reaction, it would be impossible to bring about the effects of this invention. Thus, it is important to allow the hydrolysis to proceed to an extent of 60% or higher and preferably 70% or higher of the desired percentage of hydrolysis while maintaining the reaction system at the above-described temperatures without allowing the humidity of the reaction system to drop. The time required for hydrolysis varies in accordance with the temperature of the treatment and is usually 1 minute or longer and preferably 3 minutes or longer. It is unfeasible to conduct the hydrolysis reaction to any sufficient extent if the hydrolysis time is too short.

The means of carrying out the hydrolysis under above-mentioned conditions are, for example, as follows. The polymer grains, to which the caustic alkali has been added in advance, are charged into a closed container and then heated to a desired temperature by blowing steam into the container; or the polymer grains, to which the caustic alkali has been added in advance, are charged for example into a rotary drum internally provided with steam pipes equipped with a number of spray nozzles and steam is then blown into the rotary drum while rotating the drum. Alternatively, the polymer grains with caustic alkali are placed on a perforated plate and steam is then passed through the polymer grains. It is also possible to add an aqueous caustic alkali solution to the polymer grains while mixing the polymer grains and supplying steam to the polymer grains. It may be feasible to use a gas, for example air, heated and humidified to a relative humidity of 80% or higher, in place of steam. It is preferred to make or line the interior of a reactor, mixer and the like equipments to be employed for the hydrolysis treatment, with which the resultant polymer of a hydrous gel form is brought into contact, with a synthetic resin. Preferred synthetic resins include polyolefins, polyesters, fluoroplastics, etc.

The granular polymer, on which the hydrolysis reaction has been allowed to proceed to a satisfactory extent in the above treatment, is thereafter dried by hot air in accordance with a method routinely employed in the art, normally, at temperatures in the range of 40°–130° C. and preferably 60°–110° C. until the water content of the granular polymer is lowered to 15 wt.% or less and preferably 10 wt.% or less. For the above drying processing, a band drier, rotary drier or the like is generally used. The thus-dried polymer is, subsequent to its comminution if necessary, classified into a final product. Grains having diameters in the range of 0.2–5 mm are generally used as the final product.

The partially-hydrolyzed acrylamide polymer obtained in accordance with the process of this invention features extremely little water-insoluble components present therein. Furthermore, it hardly forms a precipitate even when dissolved in a solution containing calcium ions at a high concentration. It is thus extremely useful as a coagulant or a secondary oil-recovering agent.

The invention will next be described in further detail in the following Examples. It should however be borne in mind that the present invention is not be limited to the following Examples.

EXAMPLE 1

Ten kilograms of a 25 wt.% aqueous solution of acrylamide were charged into a 15-liter polymerization reactor, followed by bubbling with nitrogen gas. Thereafter, 2,2-azobis-(2-amidinopropane) hydrochloride and sodium bisulfite were added respectively in such amounts that their concentrations became 1,000 ppm and 100 ppm of the monomer. The polymerization was initiated at 20° C. and lasted for 5 hours.

The resultant gel-like polymer (water content: 75 wt.%), obtained in the above polymerization, was granulated into grains each of about 3 mm in diameter by means of a meat grinder-like extrusion granulator and then passed into a screw conveyor equipped with a double-helical ribbon screw. A 47% aqueous caustic soda solution was sprayed over the grains in the amount of 90 g per kg of the grains (i.e., in an amount sufficient to hydrolyze 30 mole % of the amido groups present in the starting polymer) while mixing the grains.

Thereafter, steam at 135° C. was blown, at a rate of 3.5 kg/cm² for each of the time periods given in Table 1, onto the grains which were placed on a 100-mesh sieve and their hydrolysis reaction was allowed to proceed while maintaining the temperatures of the grains at 70° C. Then, the thus-treated grains were dried for 60 minutes by hot air of 100° C. to a water content of 12 wt.% or lower.

The thus-prepared granular polymers were dissolved in water and the proportions of insoluble components were measured. Results are shown in Table 1. Incidentally, the polymer identified as No. 4 is a polymer obtained in accordance with the prior art process, namely, by spraying an aqueous solution of caustic soda over grains of a hydrous polymer gel and then immediately drying them with hot air.

acid sodium sulfite were added in such amounts that their concentrations became 1,000 ppm and 100 ppm respectively. The polymerization was initiated at 20° C. and allowed to proceed for 5 hours.

The resultant gel-like polymer taken out of the polymerization reactor was extruded as grains of 3 mm in diameter from a meat grinder-like extrusion granulator onto a screw conveyor equipped with a double helical ribbon screw.

Ninety grams of a 47% aqueous solution of caustic soda (which contained caustic soda in an amount sufficient to hydrolyze 30% of the amido groups in the polymer) at 25° C. were sprayed over 1 kg of the above-obtained grains (water content: about 75 wt.%; grain temperature: 20° C.) while mixing the grains. The thus-sprayed grains were stirred for 3 minutes into a uniform mixture.

The polymer grains, which had been sprayed with the aqueous caustic soda solution, (water content: about 75 wt.%; grain temperature: 22° C.) were then placed in a polypropylene-made rotary drum equipped with steam pipes having spray nozzles and four baffle plates and the rotary drum was rotated at 40 r.p.m. While the drum was rotated, steam at 135° C. was blown into the drum through a steam pipe for a predetermined time period so as to maintain the granular polymer at 80° C., thereby hydrolyzing the same granular polymer. The water content of the thus-obtained grains was 74.5 wt.% and this water content was not lowered to any substantial extent in the course of the hydrolysis reaction.

Thereafter, hot air at 100° C. was used for 60 minutes to dry the grains until the water content of the granular polymer had been reduced to 12 wt.% or less.

Similar to Example 1, the thus-obtained hydrolyzed polymer was subjected to various measurements or tests.

Results are summarized in Table 2.

TABLE 2

| No. | Time period maintained at 80° C. (min.) | Percentage hydrolysis after maintained at 80° C. (%) | Content of water-insoluble components (wt. %) |
|---|---|---|---|
| 1 | 2 | 24 | trace |
| 2 | 10 | 28 | trace |

TABLE 1

| No. | Time period maintained at 70° C. (min) | Percentage hydrolysis after maintained at 70° C. (%) | Contents of water-insoluble components (wt. %)* | Ca²⁺-precipitation test** (ppm) | Percentage hydrolysis of polymer (%) | Viscosity of polymer product*** (cps) |
|---|---|---|---|---|---|---|
| 1 | 1 | 16.8 | 0.3 | 2,000 | 28 | 200 |
| 2 | 2 | 21.0 | 0.1 | 10,000< | 30 | 210 |
| 3 | 15 | 24.0 | trace | 10,000< | 30 | 210 |
| 4 | none (control) | 7.3 | 1.0 | 500 | 29 | 190 |

Note:
*Content of water-insoluble components: Indicates the percentage of insoluble components upon dissolving each 5 g of the polymers at room temperature in 5,000 ml of water, and stirring for 120 minutes.
**Ca²⁺-precipitation test: Indicates the Ca²⁺ concentration at the precipitation point when an aqueous solution containing calcium chloride in the concentration of 4% as measured in terms of Ca²⁺ ions was gradually dropped into each aqueous 0.1 wt. % polymer solution with stirring.
***Viscosity: Each of the polymers was dissolved in an aqueous 4% NaCl solution to give the polymer concentration of 0.5% and its viscosity at 25° C. was measured by a Model-B viscometer (No. 2 rotor; 60 r.p.m.).

EXAMPLES 2

Ten kilograms of a 25 wt.% aqueous solution of acrylamide were charged into a 15-liter polymerization reactor, followed by bubbling with nitrogen gas. Thereafter, 2,2-azobis(2-amidinopropane)hydrochloride and

| No. | Ca²⁺-precipitation test (ppm) | Percentage hydrolysis of polymer product (%) | Viscosity of polymer product (cps) |
|---|---|---|---|
| 1 | 10,000< | 30 | 210 |

TABLE 2-continued

| 2 | 10,000< | 30 | 220 |

We claim:
1. A process for preparing solid, water-soluble, partially hydrolyzed acrylamide polymer which comprises the following steps,
    (A) polymerizing an aqueous monomer solution containing acrylamide or mixture of acrylamide and other copolymerizable monomers, in the presence of polymerization initiator to obtain a hydrous gel of water-soluble acrylamide polymer,
    (B) dividing the thus obtained hydrous gel into grains,
    (C) bringing the grains into contact with an aqueous caustic alkali solution,
    (D) maintaining the thus obtained polymer grains at a temperature of from 50° to 150° C. to hydrolyze the amido groups in the polymer for a time sufficient to achieve 60% or more of the desired degree of hydrolysis while maintaining the reduction in the water content of the polymer at 10% or less, and
    (E) drying the thus obtained polymer grains with hot air.

2. A process according to claim 1, where said step D is effected by bringing steam into contact with the polymer grains.

3. A process according to claim 1, wherein said step D is effected by contacting the polymer grains with a heated humidified gas.

4. A process according to claim 1, wherein the surface of the reaction apparatus in contact with the polymer gel is made of or coated or lined with synthetic resins.

5. A process according to claim 1, wherein said monomer solution is a 15 to 45 percent by weight aqueous solution of acrylamide.

6. A process according to claim 1, wherein said caustic alkali is sodium hydroxide.

* * * * *